Figure 1:
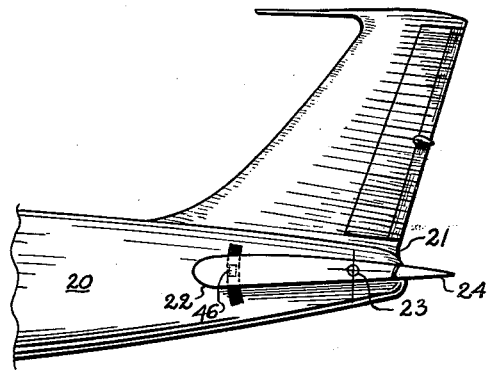

Sept. 19, 1961  J. L. DORN  3,000,595
ELEVATOR TAB CONVERTIBLE FROM AN ANTI-BALANCE
TAB TO AN ASSIST TAB
Filed July 21, 1959  2 Sheets-Sheet 1

INVENTOR.
JOHN L. DORN
BY
*Roy Mattern Jr.*
ATTORNEY

INVENTOR.
JOHN. L. DORN
BY *Roy Mattern Jr.*
ATTORNEY

United States Patent Office 3,000,595
Patented Sept. 19, 1961

3,000,595
ELEVATOR TAB CONVERTIBLE FROM AN ANTI-BALANCE TAB TO AN ASSIST TAB
John L. Dorn, Seattle, Wash., assignor to Boeing Airplane Company, Seattle, Wash., a corporation of Delaware
Filed July 21, 1959, Ser. No. 828,659
13 Claims. (Cl. 244—82)

This invention refers to the aerodynamic control surfaces of aircraft, and more particularly to the horizontal tail surfaces having an adjustable horizontal stabilizer and an elevator equipped with tabs for control, antibalance and assist purposes.

This invention comprises such horizontal tail surfaces including tabs, the function of which depends upon the requirements of flight which are indicated by the positions of the movable horizontal stabilizer. As the stabilizer is moved, either from its cruise and/or somewhat normal deflected positions to a nose down landing condition and/or to any appreciable nose down setting, the tab is moved to function respectively and alternately either as an anti-balance tab or as an assist tab.

Figure 2:
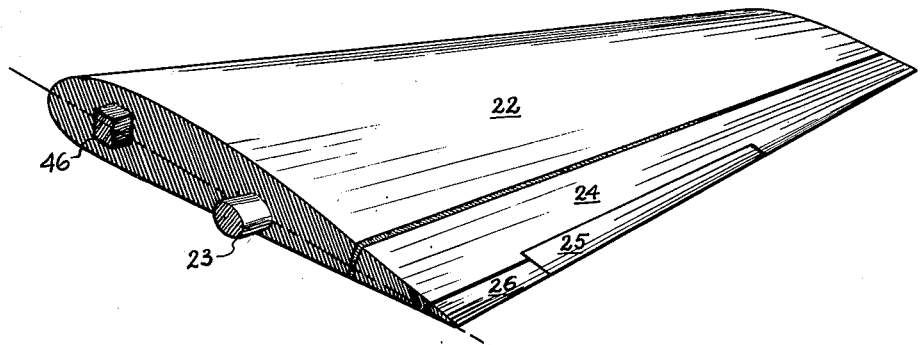
Figure 3:
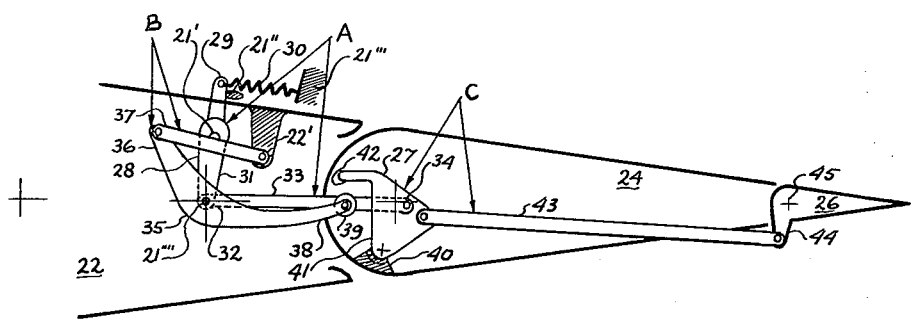
Figure 4:
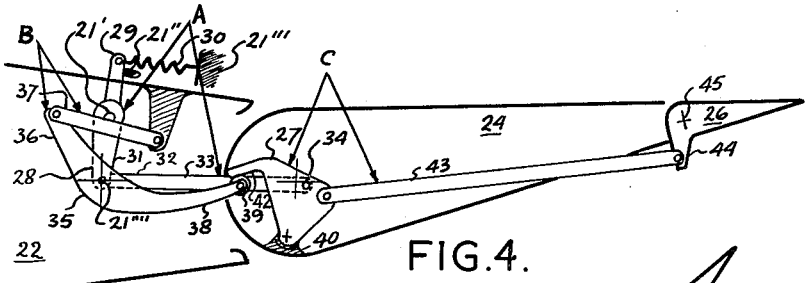
Figure 5:
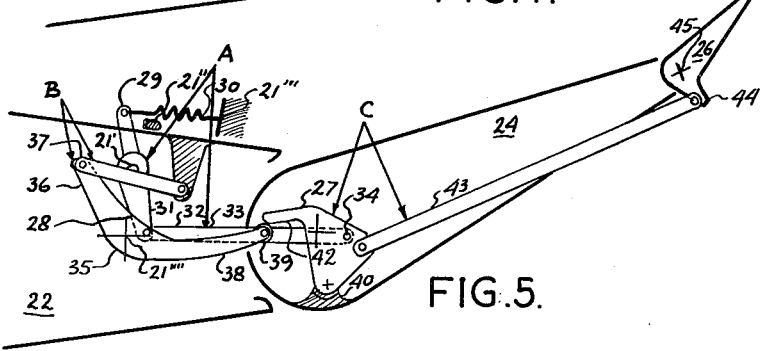
Figure 6:
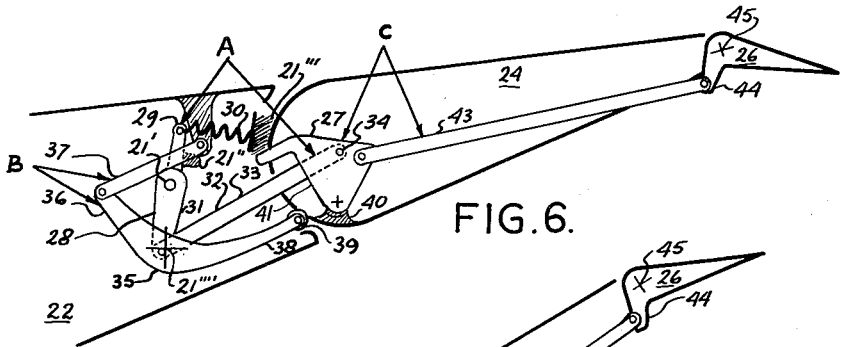
Figure 7:
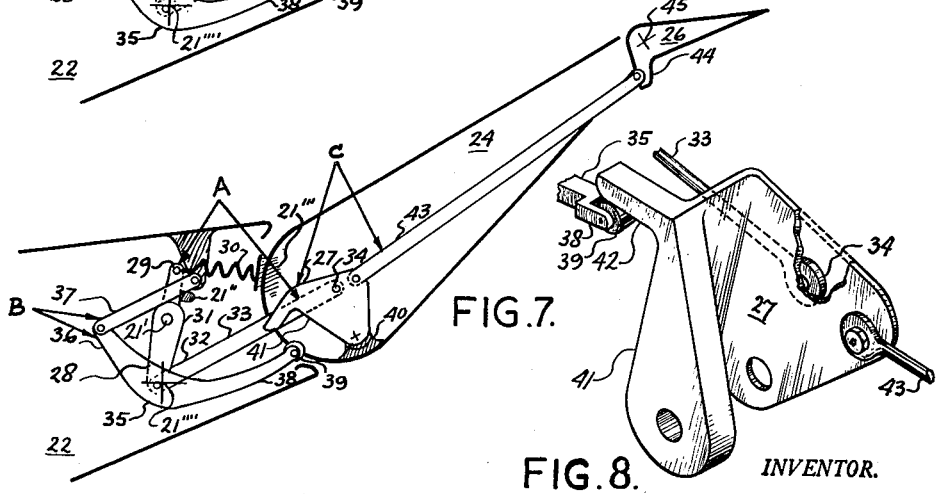

This invention will be more clearly understood by reference to the following figures in the drawings:

FIGURE 1 is a side elevation of an airplane tail,

FIGURE 2 is a perspective plan view of the movable stabilizer, elevator and tabs, one side only, of the airplane tail shown in FIGURE 1, FIGURES 3, 4 and 5 show the movable stabilizer trimmed for cruise with the tab functioning as an antibalance tab as it rotates relative to the elevator and governed by the linkage, the elevator being in the mid position in FIGURE 3, at 8° in FIGURE 4 and at 25° in FIGURE 5, FIGURES 6 and 7 show the movable stabilizer in nose down condition, as it might be upon landing, with the tab functioning as an assist tab as it rotates relative to the elevator and governed by the linkage, the elevator being in the mid position in FIGURE 6, and at 25° in FIGURE 7.

Figure 8:
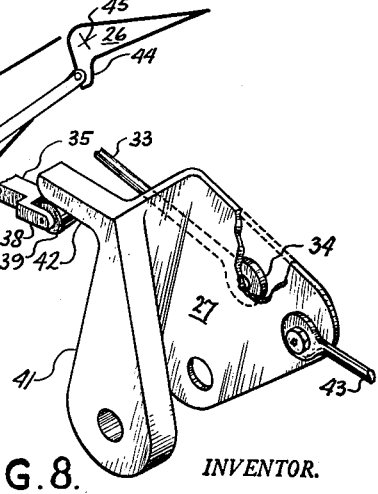

FIGURE 8 is a partial perspective view of the intercooperating parts of the linkage branches acting through a cam common to the movement of all branches.

As will be noted in FIGURES 1 and 2, the dual functioning tab is needed when an airplane 20 has a tail 21, including a large horizontal stabilizer 22 that is pivotally adjustable to trim and otherwise control the airplane 20. This pivotally adjustable horizontal stabilizer 22 moves about its pivot 23 and supports at its trailing edge a pivotally mounted elevator 24 which in turn pivotally supports two tabs, one being the primary control tab 25, which is directely moved by the pilot to initiate movement of the entire elevator 24, the other being the dual functioning tab 26.

As a result of this operational and structural arrangement, movement of the large horizontal stabilizer 22 about its pivot 23, as a force is applied at 46, necessarily repositions the elevator 24 with respect to the orientation of the entire flying system.

During cruise and/or flaps up flight when the horizontal stabilizer remains in a substantially neutral relative angle of attack, the pilot through his control tabs 25 normally realizes a lightening effect when the elevator 24 is deflected through large angles. To overcome this effect, an anti-balance tab is required. As shown in FIGURES 3, 4 and 5, air loads are developed by tab 26 functioning as an anti-balance tab, such loads supplementing the elevator 24 loads occurring at these larger elevator deflection angles. This overall higher aerodynamic loading causes the pilot to increase the angle of the control tabs 25 to enhance their effectiveness and in so doing the pilot is confronted with the desired higher control forces.

During other flight conditions such as those encountered in landing, with the flaps possibly lowered, the stabilizer 22 is pivoted quite extensively. Under such flight conditions air loads tend to move the elevator 24 and, as its trailing edge lowers, the effectiveness of the stabilizer 22 is reduced. To avoid this loss of stabilizer effectiveness, a tab located in the position of tab 26 is needed to cause rotation of the elevator 24 back to its neutral position.

Because, during this landing flight condition, the antibalance function of the tab 26, noted previously, is no longer required, the function of the tab 26 is changed to fulfill the requirements of an assist tab during landing and other related flight conditions. This function change of the tab 26 is accomplished automatically by mechanism triggered by movement of the horizontal stabilizer 22.

The mechanism comprises linkage having essentially separate but partially related branches which are illustrated in FIGURES 3, 4, 5, 6, 7 and 8. The linkage system extends from and between the fuselage 20 near the tail 21, the movable horizontal stabilizer 22, the elevator 24 and the tab 26. There are three branches of the linkage system. Branch A is substantially supported and guided by the fuselage or body structure in the tail 21, eventually terminating in the linkage branch C supported in the elevator 24. Crank arm 28 of branch A pivots near its center, about a tail mounted structural axis 21'. Its upper end 29 is held against a tail structural stop 21" by force of a spring 30 anchored between the upper end 29 and another tail structural member 21'''. Its lower end 31 is pivotally connected to the end 32 of the connecting rod 33, also of branch A, which extends to pivotally join at its end 34, branch C.

Branch B is supported by both the tail structure 31 and the stabilizer 22. A crescent shaped crank arm 35 is pivotally mounted to the tail structure 21 at 21''''. One end 36 is pivotally attached to a connecting rod 37, joining the crank arm 35 to the stabilizer structure at 22'. The other end 38 of the crank arm 35 rotatably supports a contacting roller or cam follower 39 which can contact branch C of the linkage.

Branch C is essentially supported on and contained within the elevator 24. A cam 27 directly connecting branches A and C, and periodically establishing contact between branches B and C, is pivotally mounted at 40 on the leading edge of the elevator 24. The connecting rod 33 of branch A is pivotally attached at its end 34 to cam 27 at a spaced distance from the cams pivotal mount at 40, in effect making the cam 27 a crank arm with respect to the combined branches A and C. The contacting roller or cam follower 39 of branch B operates within a contoured recess 41 of the cam 27 of branch C occasionally contacting the projecting undersurface 42 of the cam 27 and, when such contact is made, the cam 27 also acts as a crank arm, this time with respect to the combined branches B and C. This intercooperation of the linkage branches A, B, and C through the cam 27 is illustrated in more detail in FIGURE 8.

The balance of branch C comprises the actuating rod 43 which connects the cam 27, at a point removed from its pivot, again using the cam 27 as a crank arm, to the tab 26 at its extending crank arm 44. Any rotation of cam 27 is transmitted through the actuating rod 43 causing rotation of the tab 26 about its pivotal mounting 45.

These respective branches A, B and C of the linkage system automatically move to position the tab 26 as changes occur in the relative positions of the movable stabilizer 22 and elevator 24, with respect to each other and the tail structure 21. In FIGURES 3, 4 and 5, the stabilizer 22 is shown substantially in the cruise position, resulting in the linkage system operating the tab 26 as an anti-balance tab; whereas in FIGURES 6 and 7, the stabilizer 22 is shown with its nose down as it would be set for landing, resulting in the linkage system operating tab 26 as an assist tab.

When operating as an anti-balance tab, tab 26 is rotated in the same sense as the elevator 24 but through larger angles near its end of travel thereby presenting an airfoil surface which supplements the total aerodynamic surface and loading of the elevator 24, both increasing the effectiveness of the tab-supplemented elevator 24—26 and requiring the pilot to increase the deflection of the control tab 25, thereby avoiding any "force lightening effect" at the increased elevator angles such as shown in FIGURE 5.

The rotation of the tab 26 into its anti-balance position is assured by the operation of the linkage system wherein branch A resiliently tends to keep the cam 27 in its neutral position relative to the elevator 24 until contact is made with the roller or cam follower 39 of branch B, the latter branch being stationary for there is no relative movement between its mounting points, 22' on the stabilizer and 21'''' on the tail structure. Once, however, contact is made between the stationary cam follower 39 of branch B and the cam 27 of branch C, the cam 27 commences rotation, moving the actuating rod 43 to pivot the tab 26 through its anti-balance positions (see FIGURES 4 and 5). During this cam 27 movement, branch A, moving against its spring 30 force, monitors the deflection of the cam 27 and consequently the deflection of the tab 26, assuring both uniform motion and the tabs 26 return to a faired position when, through employment of the control tab 25, the elevator 24 is returned to its faired position.

When operating as an assist tab, tab 26 is rotated in the opposite sense as the elevator 24, but through larger angles near its end of travel thereby presenting an airfoil surface which supplements the control tab 25 in moving the elevator 24 into an effective position, such as illustrated in FIGURE 7.

The rotation of the tab 26 into its assist position is likewise assured by the operation of the linkage system wherein branch B, formerly cooperatively responsible for the tab 26 becoming an anti-balance tab, is moved, as the stabilizer 22 is moved, pulling the cam follower 39 out of the effective range of the cam 27. This movement results, in part, because the mounting points, 22' on the stabilizer and 21'''' on the tail structure, become farther apart upon rotation of the stabilizer 22 with respect to the tail structure 21. Then branch A, without the interference of branch B, causes opposite rotation of cam 27 resulting in movement of the actuating rod 43 to pivot the tab 26 through its assist positions (see FIGURES 6 and 7).

The utilization of the linkage system automatically operating in conjunction with this one tab 26, depending solely upon the positioning of the movable stabilizer 22 for converting the tab 26 from an anti-balance tab to an assist tab, conveniently provides the pilot with these valuable additional control characteristics.

I claim as my invention:

1. In an airplane having horizontal tail surfaces inclusive of at least one of each of the following: a movable stabilizer pivotally mounted on the airplane tail structure, an elevator pivotally mounted on the stabilizer and a control tab pivotally mounted on the elevator; the improvement comprising at least one additional dual acting tab pivotally mounted on the elevator which alternately functions as either an anti-balance tab or an assist tab, depending on the pivotal position of the stabilizer, and mechanism supported throughout the tail structure, stabilizer and elevator for selectively actuating the additional dual acting tab.

2. The airplane improvement as defined in claim 1 wherein the mechanism has an automatic changeover means to change the dual functioning tab from an anti-balance tab to an assist tab automatically.

3. The airplane improvement as defined in claim 2 where in the automatic changeover means of the mechanism of the dual functioning tab is triggered by the movement of the stabilizer as the latter is adjusted under variable flight conditions.

4. The airplane improvement as defined in claim 3 wherein the automatic changeover means of the dual tab actuating mechanism is triggered by nose down movement of the stabilizer.

5. The airplane improvement as defined in claim 4 wherein the mechanism comprises linkage which is respectively both continuously and intermittingly operable between the elevator and the dual functioning tab.

6. The airplane improvement as defined in claim 5 wherein at least one combination of the linkage is resiliently and continuously operable between the elevator and the dual functioning tab and wherein at least one other combination of the linkage is swingably and intermittingly operable between the elevator and the dual functioning tab.

7. The airplane improvement as defined in claim 6 wherein the linkage combinations include a resilient linkage branch which is pivotally connected to both the elevator and the tail structure, and a swingable linkage branch which is pivotally connected to both the tail structure and the stabilizer.

8. The airplane improvement as defined in claim 7 wherein the linkage combinations include at least one linkage branch supported within the elevator operable between the dual functioning tab and both the respective resilient and swingable linkage branches.

9. The airplane improvement as defined in claim 8 wherein the linkage combinations include at least three branches, one branch resiliently and continuously connected between the tail structure and the third branch supported with the elevator, another branch swingably and pivotally supported on both the tail structure and elevator and intermittingly in contact with the third branch supported with the elevator, and the third branch supported in the elevator and connected to the dual functioning tab, the third branch being actuated and modulated by the resilient and swingable branches to operate the tab.

10. The airplane improvement as defined in claim 9 wherein the mechanism functions to operate the dual functioning tab either as an anti-balance tab or as an assist tab, the changeover from an anti-balance tab function to an assist tab function, by alteration of the mechanism, occurring when the stabilizer is pivoted into its nose down position, such movement of the stabilizer relative to the tail structure primarily altering the relative position of the swingable linkage branch so that the resilient linkage branch mounted solely on the tail structure is independently effective in actuating the linkage branch supported within the elevator causing the tab to function as an assist tab whereas formerly the swingable linkage branch actuated the linkage branch within the elevator, overriding the resilient linkage branch thereby causing the tab to function as an anti-balance tab.

11. An improvement in the aerodynamic control of airplanes equipped with tail horizontal surfaces inclusive of movable stabilizers, elevators and tabs, comprising the airplane structure in the vicinity of the tail, a pivotally mounted stabilizer on the airplane structure, a pivotally mounted elevator on the movable stabilizer, a control tab pivotally mounted on the elevator, a dual functioning tab pivotally mounted on the elevator and a means mounted throughout the structure, stabilizer and elevator; such means operating to actuate the dual functioning tab as an anti-balance tab when the movable stabilizer is substantially located in its neutral faired position and as an assist tab when the movable stabilizer is substantially located in its nose down position.

12. On an airplane having a movable stabilizer and elevator, a dual functioning elevator tab and an associated means mounted between the dual functioning tab, elevator, movable stabilizer and structure of the airplane to actuate the dual functioning tab as an elevator anti-balance tab when the movable stabilizer is in its substantially neutral position and as an elevator assist tab when the movable stabilizer is in its substantially nose down position.

13. In an airplane having a movable horizontal stabilizer, an elevator on the stabilizer and a control tab on the elevator, the improvement comprising a dual functioning tab also on the elevator and an actuation means therefor moving the tab as an anti-balance tab when the movable stabilizer is in its substantially neutral faired position and as an assist tab when the movable stabilizer is in its substantially nose down position.

References Cited in the file of this patent

UNITED STATES PATENTS

| | | |
|---|---|---|
| 2,173,767 | Read | Sept. 19, 1939 |
| 2,357,465 | Focht | Sept. 5, 1944 |
| 2,557,426 | George | June 19, 1951 |
| 2,669,401 | Bosserman | Feb. 16, 1954 |

FOREIGN PATENTS

| | | |
|---|---|---|
| 747,517 | Great Britain | Apr. 4, 1956 |